(12) United States Patent
Caynak

(10) Patent No.: US 11,897,563 B2
(45) Date of Patent: Feb. 13, 2024

(54) MACHINE CONFIGURATION SYSTEM HAVING PLATFORM

(71) Applicant: MODULER MAKINA SANAYI VE TICARET ANONIM SIRKETI, Istanbul (TR)

(72) Inventor: Mansuri Caynak, Istanbul (TR)

(73) Assignee: MODULER MAKINA SANAYI VE TICARET ANONIM SIRKETI, Istanbul (TR)

( * ) Notice: Subject to any disclaimer, the term of this patent is extended or adjusted under 35 U.S.C. 154(b) by 14 days.

(21) Appl. No.: 17/624,255

(22) PCT Filed: Apr. 29, 2020

(86) PCT No.: PCT/TR2020/050354
§ 371 (c)(1),
(2) Date: Dec. 31, 2021

(87) PCT Pub. No.: WO2021/002817
PCT Pub. Date: Jan. 7, 2021

(65) Prior Publication Data
US 2022/0371673 A1 Nov. 24, 2022

(30) Foreign Application Priority Data

Jul. 2, 2019 (TR) .................................. 2019/09839

(51) Int. Cl.
*B62D 63/02* (2006.01)
*B62D 21/09* (2006.01)
*B62D 21/18* (2006.01)

(52) U.S. Cl.
CPC ........... *B62D 63/025* (2013.01); *B62D 21/09* (2013.01); *B62D 21/186* (2013.01)

(58) Field of Classification Search
CPC .... B62D 63/025; B62D 21/186; B62D 21/09; B62D 21/12; B62D 49/02
See application file for complete search history.

(56) References Cited

U.S. PATENT DOCUMENTS 3,779,411 A    12/1973   Moretti
6,010,182 A *   1/2000   Townsend ................. B64C 1/08
                                                           296/29

(Continued)

FOREIGN PATENT DOCUMENTS

CA          3173005 A1 *   9/2021   ......... B60G 17/0408
DE    102014008720 A1    12/2015

(Continued)

OTHER PUBLICATIONS

Akino et al. JP 2012-218606 Construction Machine, Machine English translation, ip.com (Year: 2012).*

(Continued)

*Primary Examiner* — Karen Beck
(74) *Attorney, Agent, or Firm* — Bayramoglu Law Offices LLC

(57) ABSTRACT

At least one machine configuration system provides formation of machines/tools in order to realize different works by means of various components and equipment which can be essentially fixed onto and removed from at least one body having at least one drive element, at least one wheel which is moved by said drive element, and at least one chassis whereon said wheel and the drive element are positioned. The novel side of the machine configuration is that in order to transfer any item from one location to another location, there is essentially at least one platform which is positioned at the upper vicinity of said body.

4 Claims, 4 Drawing Sheets

(56) References Cited

U.S. PATENT DOCUMENTS

| | | | |
|---|---|---|---|
| 7,124,853 | B1 | 10/2006 | Kole, Jr. |
| 2021/0094459 | A1* | 4/2021 | Caynak ................. B60L 50/40 |

FOREIGN PATENT DOCUMENTS

| | | | | |
|---|---|---|---|---|
| EP | 0864485 | A3 | 6/1999 | |
| EP | 2298597 | A1 * | 3/2011 | ............ B60P 1/6481 |
| EP | 2483134 | B1 | 3/2015 | |
| EP | 2896549 | A2 * | 7/2015 | ............ B62D 21/12 |
| JP | 2012218606 | A * | 11/2012 | |
| KR | 20110002089 | U * | 8/2011 | |
| TR | 201708183 | A2 | 9/2017 | |
| WO | WO-2006114945 | A1 * | 11/2006 | ................ B60P 7/18 |
| WO | WO-2019224435 | A1 * | 11/2019 | ................ B60J 5/02 |

OTHER PUBLICATIONS

U. Humbaur, EP 2483134 Trailer, in particular flat-bed trailer, Machine English translation, ip.com (Year: 2015).*
R. Kammerleitner, DE 10 2014 008720 Heavy truck with forklift function, Machine English translation, ip.com (Year: 2016).*
U. Humbaur, EP 2896549, Trailer, in particular flat-bed trailer, Machine English Translation, ip.com (Year: 2018).*
C. Binder, WO 2019/224435 Modular Vehicle, Machine English Translation, ip.com (Year: 2019).*

* cited by examiner

MACHINE CONFIGURATION SYSTEM HAVING PLATFORM

CROSS REFERENCE TO THE RELATED APPLICATIONS

This application is the national phase entry of International Application No. PCT/TR2020/050354, filed on Apr. 29, 2020, which is based upon and claims priority to Turkish Patent Application No. 2019/09839, filed on Jul. 2, 2019, the entire contents of which are incorporated herein by reference.

TECHNICAL FIELD

The present invention relates to at least one machine configuration system which provides formation of machines/tools for realizing different works by means of various components and equipment which can be essentially fixed on and removed from at least one body having at least one drive element, at least one wheel which is moved by said drive element and at least one chassis whereon said wheel and said drive element are positioned.

BACKGROUND

Today, there are diggers-loaders, telehandlers, elastic loaders, personnel platforms, field trucks, military vehicles which have been produced for long years and where each type has its unique design and production method. The common characteristics of these machines are that they accommodate equipment which realize the process and hydraulic units which control the equipment. Mostly, the used components are the same and the locations and equipment of the components are different.

A purchased machine can only realize the work which is related to the equipment where the machine is made. For instance, by means of the rubber wheeled loader, only loading processes can be realized, and agricultural processes can be realized by fixing only agricultural attachments by means of agricultural tractor. For different works, machines where different equipment is fixed shall be taken. All of these lead to difficulties like formation of waste machines and like time and stock cost for waiting for the production of the desired machine type and the distribution thereof.

In order to partially prevent this problem with the developing technology, in the literature, in the patent with no TR2017/08183, vehicle embodiment having different cabinets is described. In the invention, a machine configuration system is described which is related to modular components and equipment which can be fixed to a body having four driven wheels realizing the different works which are realized by work machines, industrial machines, agricultural machines, military vehicles, remote-control, autonomous, etc. machines.

As a result, because of all of the abovementioned problems, an improvement is required in the related technical field.

SUMMARY

The present invention relates to a machine configuration system, for eliminating the above mentioned disadvantages and for bringing new advantages to the related technical field.

An object of the present invention is to provide a machine configuration system with carrying function.

Another object of the present invention is to provide a machine configuration system with increased safety.

In order to realize the abovementioned objects and the objects which are to be deducted from the detailed description below, the present invention is at least one machine configuration system which provides formation of machines/tools in order to realize different works by means of various components and equipment which can be essentially fixed onto and removed from at least one body having at least one drive element, at least one wheel which is moved by said drive element, and at least one chassis whereon said wheel and the drive element are positioned. Accordingly, in order to transfer any item from one location to another location, there is essentially at least one platform which is positioned at the upper vicinity of said body. Thus, thanks to the platform of the body having changeable module structure, the items to be carried can be carried from one location to another location.

In a possible embodiment of the present invention, said platform is essentially configured to cover said wheels of the body. Thus, the carried items are prevented from giving damage to the wheels or to another mechanical element by contacting the wheel due to any reason.

In a possible embodiment of the present invention, the platform has a modular structure since it consists of at least more than one plate. Thus, when any region of the platform is deformed or required to be changed, easy changing and assembly facility are provided.

In a possible embodiment of the present invention, said plate is connected to said chassis by means of at least one connection element. Thus, the plates can be easily fixed onto and removed from the chassis.

In a possible embodiment of the present invention, the side of the plate which faces the item to be carried has a surface which is at least partially rough. Thus, the transport items are prevented from sliding and falling due to any reason while being carried.

In a possible embodiment of the present invention, at least one locking mechanism is connected to the plate by means of at least one plate hole provided on the plate. Thus, in the machine configuration system, different functions are added to the platform and the platform is made more usable.

REFERENCE NUMBERS

10 Machine Configuration System
20 Body
21 Wheel
22 Drive Element
23 Control Unit
30 Chassis
31 Connection Profile
32 Flap
33 Connection Housing
40 Platform
41 Plate
42 Connection Element
43 Hole
44 Rough Surface
45 Plate Hole
50 Locking Mechanism
51 Lock
52 Locking Body
53 Body Profile
54 Shaft
55 Support
56 Nut
57 Arm
58 Latch
59 Latch Body
60 Drive End
(I) Telehandler Module
(II) Tractor Module
(III) Loader Module

DETAILED DESCRIPTION OF THE EMBODIMENTS

In this detailed description, the subject matter machine configuration system (10) is explained with references to examples without forming any restrictive effect only in order to make the subject more understandable.

The present invention relates to at least one machine configuration system (10) which provides formation of machines/tools in order to realize different works by means of various components and equipment which can be fixed and removed. Said machine configuration system (10) has at least one body (20), and by means of said body (20), the components which are required for loading, soil processing or carrying can be operated.

Figure 1:
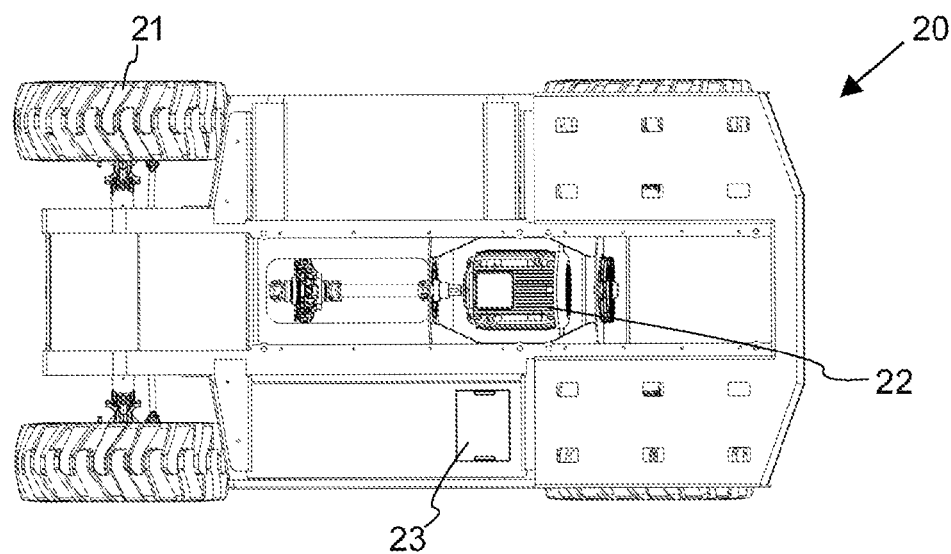
FIG. 1 is a representative top view of the body positioned in the subject matter machine configuration system.

In FIG. 1, a representative top view of the body (20) positioned in the subject matter machine configuration system (10) is given. Accordingly, the body (20) has at least one drive element (22) and at least one wheel (21) moved by said drive element (22). Thanks to the drive element (22) and the wheel (21), the body (20) can displace. At least one control unit (23) is positioned for controlling energizing and guiding of the wheel (21) and the drive element (22) in the body (20). Said control unit (23) provides operation of the body (20) particularly under hard conditions without the operator. Moreover, at least one chassis (30) is positioned in the body (20) where the wheel (21) and the drive element (22) are positioned.

Figure 2:
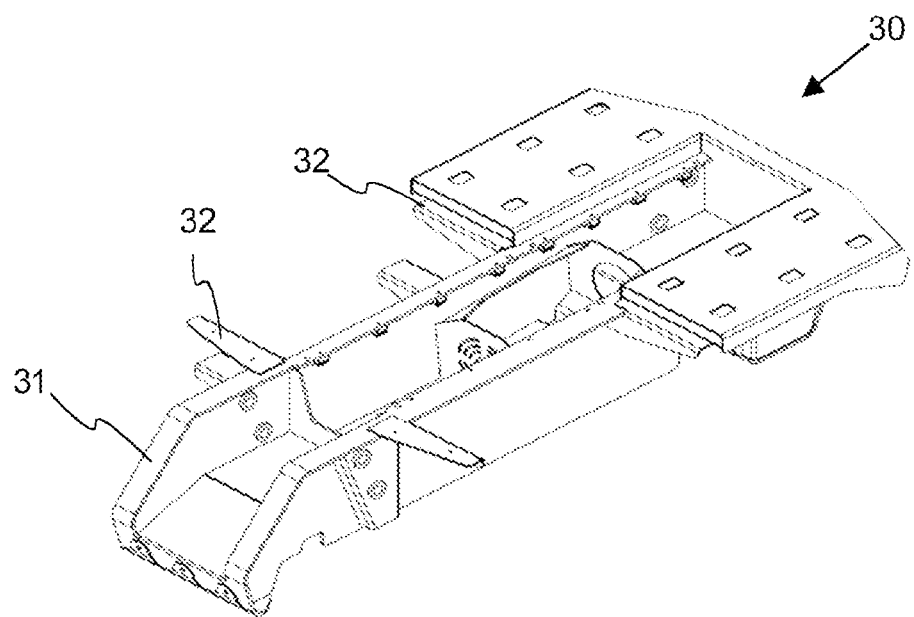
FIG. 2 is a representative isometric view of the chassis positioned in the subject matter machine configuration system.

In FIG. 2, a representative isometric view of said chassis (30) positioned in the subject matter machine configuration system (10) is given. Accordingly, the chassis (30) has at least one connection profile (31) and flaps (32) connected to said connection profile (31) so as to be essentially orthogonal thereto. In the preferred embodiment of the present invention, there are two connection profiles (31) on the chassis (30) so as to be parallel to each other. Said flaps (32) and said connection profiles (31) have frame structure essentially in a manner covering the wheel (21) and the drive element (22).

Figure 3:
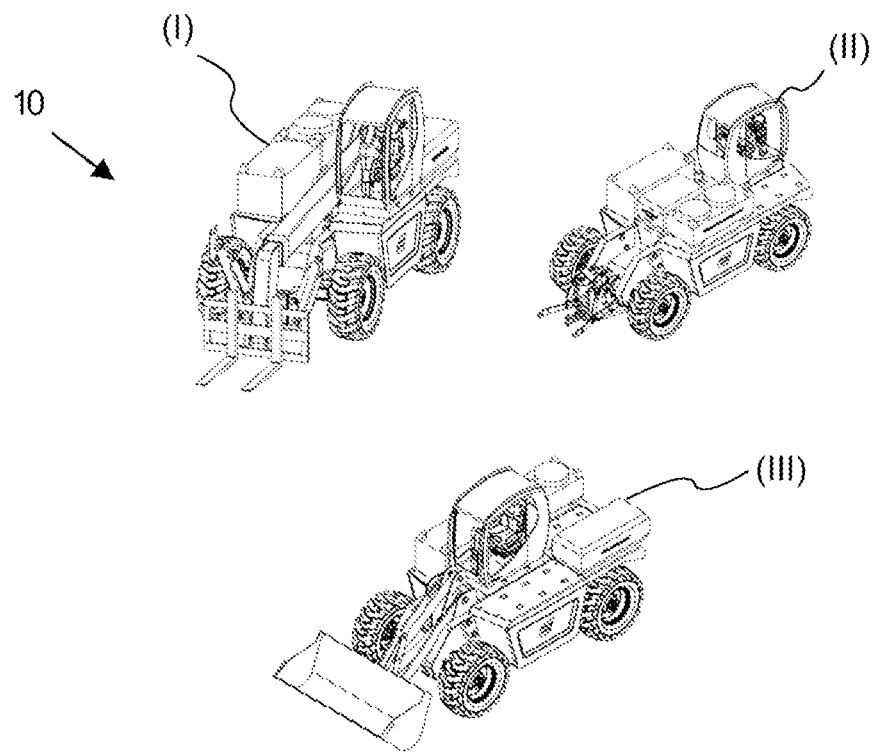
FIG. 3 is a representative isometric view of the exemplary usage modules of the subject matter machine configuration system.

In FIG. 3, one each representative isometric views of the exemplary usage modules of the subject matter machine configuration system (10) is given. Accordingly, on the body (20), tractor module (II), telehandler module (I) or loader module (III) can be positioned. Thanks to this, the body (20) can be transformed into machine/tool which functions in different areas.

Figure 4:
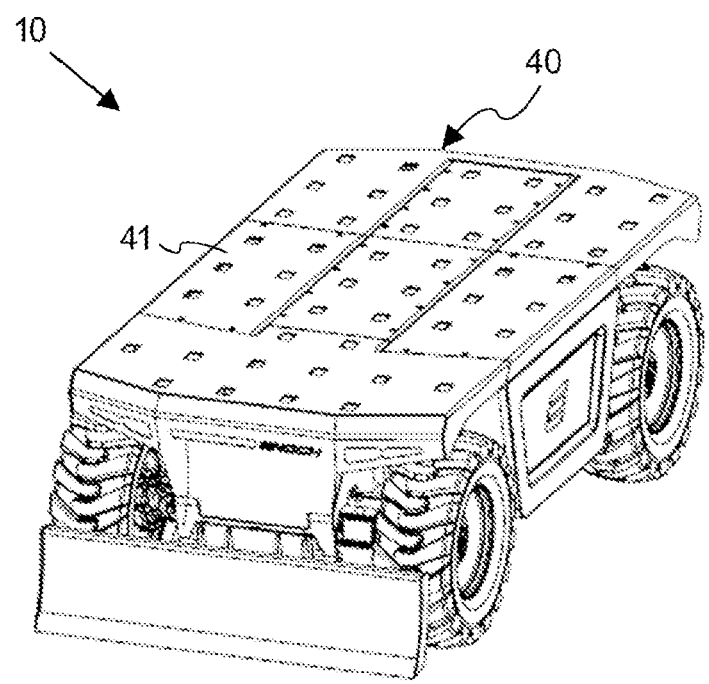
FIG. 4 is a representative isometric view of the platform positioned in the subject matter machine configuration system.

In FIG. 4, a representative isometric view of at least one platform (40) positioned in the subject matter machine configuration system (10) is given. Accordingly, said platform (40) essentially has a flat surface and provides carrying of items thereon depending on the work and industry branch.

Figure 5:
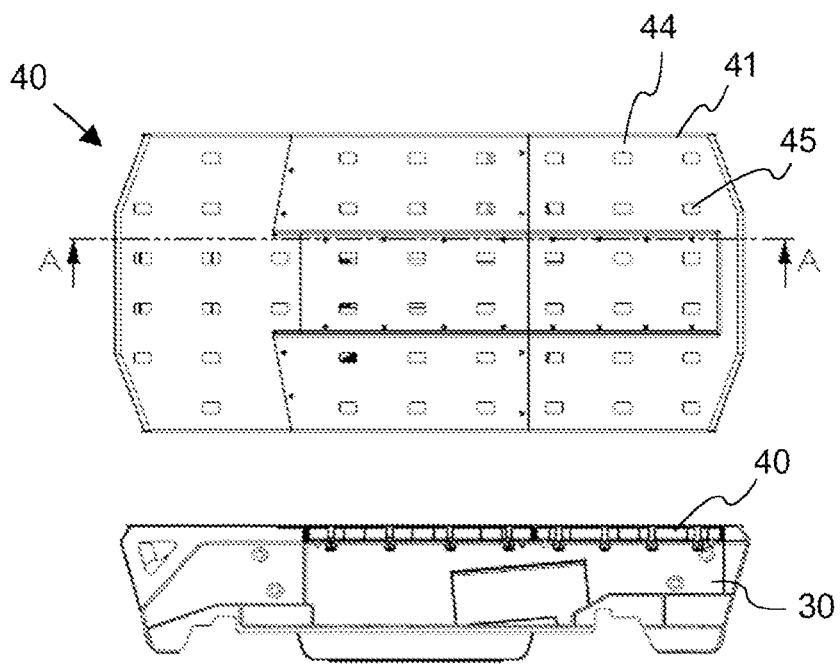
FIG. 5 is a representative top view of the platform positioned in the subject matter machine configuration system and a cross-sectional view of said top view.

In FIG. 5, a representative top view of the platform (40) positioned in the subject matter machine configuration system (10) and a cross-sectional view of said top view are given. Accordingly, in a possible embodiment, the platform (40) can be formed by bringing the plates (41) together. Said plates (41) make the platform (40) modular. The plates (41) can be removed from the body (20) and provides fixation of different modules (telehandler module (I), tractor module (II) and loader module (III), etc.). Moreover, thanks to the plates (41), in case there is deformation or failure in any location of the platform (40), the platform (40) can be easily removed and can be changed. Besides, thanks to the small part structure of the plates (41), production and construction easiness onto the body (20) is provided. The modular structure of the platform (40) provides covering of the exposed parts, which may occur when different modules are fixed onto the body (20), by means of plates (41) and provides functioning as cover in the machine configuration system (10). Particularly some equipment (generator, battery, etc.) positioned between the wheels (21) in the body (20) can be easily accessed by means of plates (41). Since some equipment (generator, battery, etc.), existing in the machine configuration system (10), is positioned between the wheels (21), the weight center approaches the floor and this decreases the overturning risk. Moreover, at least partially rough surface (44) is positioned on the side of the plates (41) facing the transport item. Said rough surface (44) prevents the sliding and falling of the transport item while the transport item is being carried.

Figure 6:
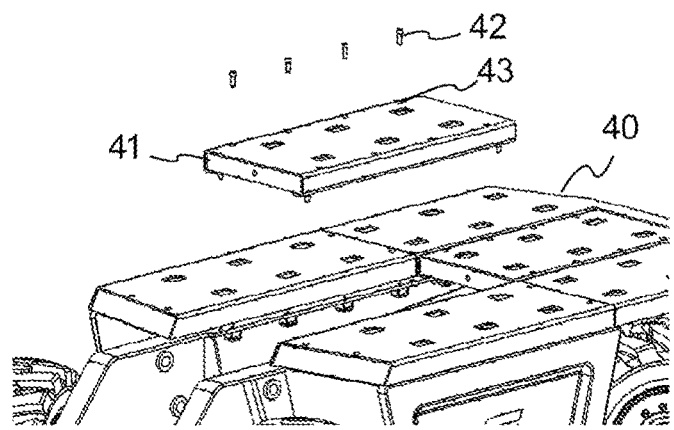
FIG. 6 is a representative view of the assembly of the connection plates to the chassis in the subject matter machine configuration system.
Figure 7:
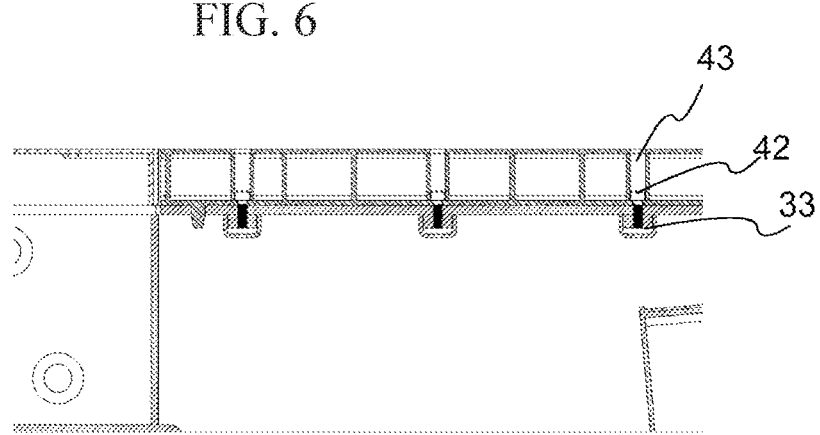
FIG. 7 is a representative view of the assembly of the connection plates to the chassis in the subject matter machine configuration system.

In FIGS. 6 and 7, the representative views of the assembly of the connection plates to the chassis (30) in the subject matter machine configuration system (10) are given. Accordingly, the assembly of the platform (40) to the chassis (30) existing on the body (20) is provided by means of passing at least one connection element (42) through at least one hole (43) provided on the plate (41). Said connection element (42) passes through said hole (43) and enters into the connection housing (33) provided on the chassis (30) and fixed thereto. In different embodiments of the present invention, the assembly of the plate (41) to the chassis (30) can also be in different forms.

Figure 8:
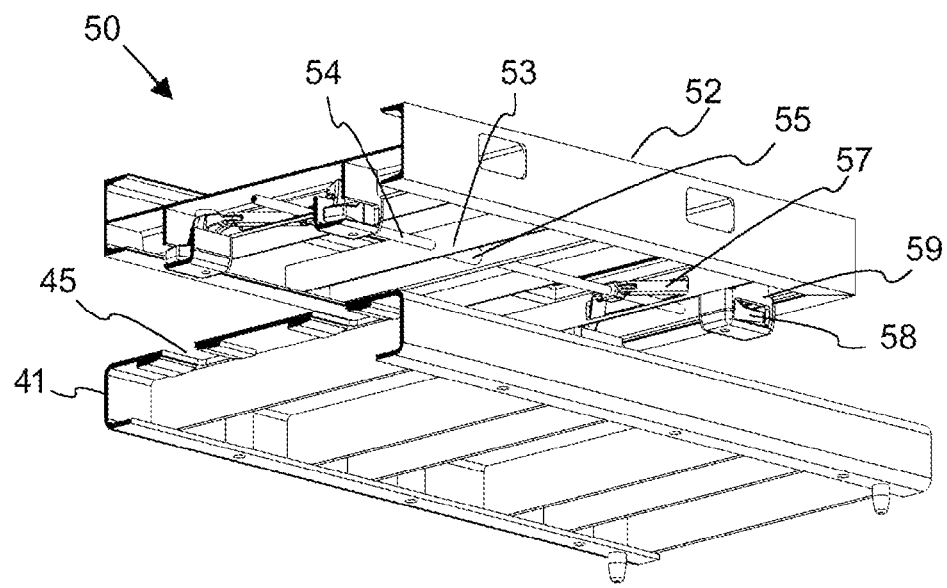
FIG. 8 is a representative isometric dismantled view of the lock mechanism in the subject matter machine configuration system.

In FIG. 8, a representative isometric dismantled view of the locking mechanism (50) in the subject matter machine configuration system (10) is given. Accordingly, in the preferred embodiments of the present invention, at least one locking mechanism (50) provides connection of special equipment like cabinet, hydraulic pack to the platform (40) without needing excessive power. Accordingly, said locking mechanism (50) has at least one locking body (52) and at least one lock (51). Said locking body (52) is essentially positioned on the plate (41) and is locked by means of said lock (51).

Figure 9:
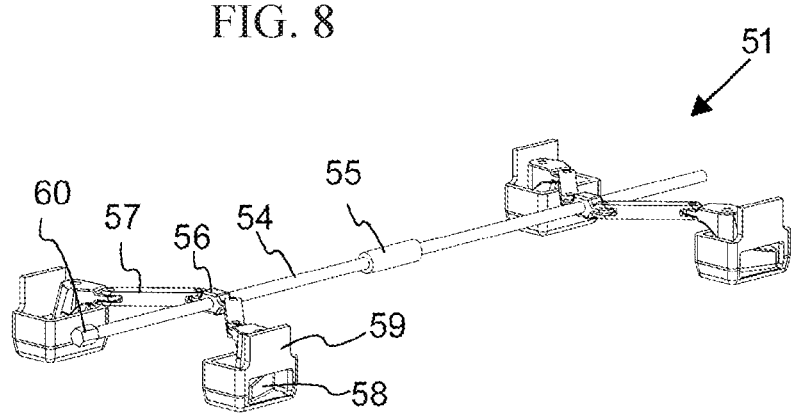
FIG. 9 is a representative isometric view of the lock in the subject matter machine configuration system.

In FIG. 9, a representative isometric view of the lock (51) in the subject matter machine configuration system (10) is given. Accordingly, the lock (51) is positioned on the locking body (52) and fixes the locking body (52) on the platform (40). The lock (51) has at least one shaft (54) and at least one latch (58) moved by means of said shaft (54). In the preferred embodiment of the present invention, the shaft (54) is an infinite screwed. At least one support (55), positioned on the shaft (54), is fixed in at least one body profile (53) positioned on the locking body (52). Moreover, at least one nut (56) is positioned on the shaft (54). As the shaft (54) is rotated around its own axis from at least one drive end (60), said nut (56) moves linearly in the shaft (54) axis. The nut (56) is connected to at least one latch body (59) by using at least one arm (57). Said arm (57) transfers the linear movement of the nut (56) in the shaft (54) axis to at least one latch (58) in said shaft body (59). With the movement of the nut (56), said latch (58) can move outwardly from the latch body (59).

Figure 10:
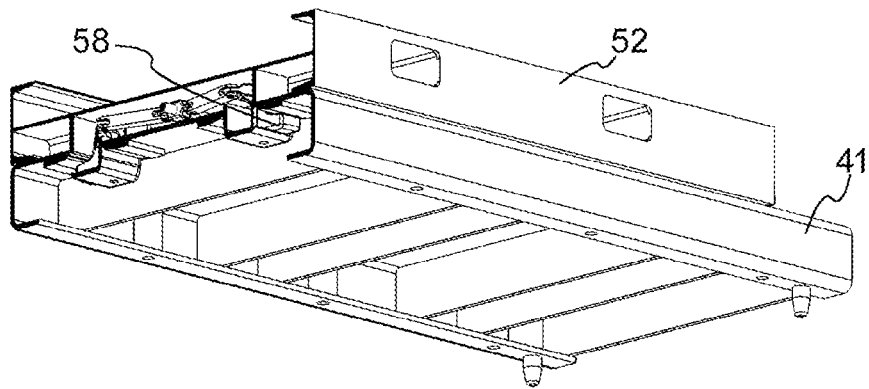
FIG. 10 is a representative assembled isometric view of the lock mechanism in the subject matter machine configuration system.

In FIG. 10, a representative assembled isometric view of the locking mechanism (50) in the subject matter machine configuration system (10) is given. Accordingly, the latch body (59) is placed to at least one plate hole (45) provided on the plate (41). In the preferred embodiment of the present invention, the arm (57), the latch (58) and the latch body (59) are four each in number and they fix the locking body (52) to the plate (41) through four locations. In an exemplary usage of the locking mechanism (50), the locking body (52) is placed onto the plate (41) by means of engagement of the latch bodies (59) to said plate holes (45). The shaft (54) is rotated through said drive end (60) and the nut (56) pushes latches (58) by means of the arm (57). Besides, the latch (58) diverges from the latch body (59) and rested to the plate (41). By means of this, a practical locking is realized.

Together with this embodiment, the telehandler module (I), the tractor module (II) and the loader module (III) are positioned on the body (20) and besides, the platform (40) is also positioned on the body (20). Thanks to the platform (40), the items desired to be carried can be carried safely. Under harsh conditions, the control unit (23) is controlled in a remote manner and the machine configuration system (10) is advanced in a non-manned manner. Besides, since the platform (40) can cover the body (20) up to the wheels (21), the wheels (21) are prevented from contacting the load and from being deformed. The platform (40) is not delimited with this described embodiment and it can be configured to permit carrying of fluid items so as to have a depth.

Moreover, in the preferred embodiments of the present invention, special equipment like cabinet, hydraulic pack can also be fixed to the platform (40) by means of the locking mechanism without leading to any problem.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A machine configuration system providing a formation of machines/tools, comprising various components and equipment for realizing different works, wherein the various components and the equipment are fixed onto and removed from at least one body, the at least one body comprises:
   at least one drive element,
   at least one wheel moved by the at least one drive element, and
   at least one chassis,
   wherein the at least one wheel and the at least one drive element are positioned on the at least one chassis, wherein the machine configuration system comprises at least one platform for transferring an item from a first location to a second location, wherein the at least one platform is positioned at an upper vicinity of the at least one body wherein the at least one platform has a modular structure and the at least one platform comprises at least one plate and wherein the at least one plate is configured to be fixed onto and removed from the chassis,
   wherein at least one locking mechanism is connected to the at least one plate by at least one plate hole provided in the at least one plate, the at least one locking mechanism is configured to fix the various components and the equipment to the at least one plate of the at least a part of the platform, wherein the at least one locking mechanism includes at least one shaft extending across the at least one plate and at least one latch that is movable by the at least one shaft in a direction that is away from the at least one shaft such that the at least one latch is mechanically engageable with and lockable to at least one plate hole of the at least one plate to implement fixing of the various components and the equipment to the at least one plate.

2. The machine configuration system according to claim 1, wherein the at least one platform is configured to cover wheels of the at least one body.

3. The machine configuration system according to claim 1, wherein the at least one plate is connected to the at least one chassis by at least one connection element.

4. The machine configuration system according to claim 1, wherein a top surface of the at least one plate faces the item to be carried, and the top surface of the at least one plate being at least partially rough.

* * * * *